United States Patent [19]

Yamamura

[11] Patent Number: 4,970,642
[45] Date of Patent: Nov. 13, 1990

[54] AN APPARATUS FOR ACCESSING A MEMORY

[75] Inventor: Kimio Yamamura, Tokyo, Japan

[73] Assignee: Hudson Soft Co. Ltd., Hokkaido, Japan

[21] Appl. No.: 244,045

[22] Filed: Sep. 13, 1988

[30] Foreign Application Priority Data

Sep. 14, 1987 [JP] Japan .................. 62-230674

[51] Int. Cl.⁵ .................. G06F 12/10; G06F 13/00
[52] U.S. Cl. .................. 364/200; 364/900;
364/255.1; 364/247; 364/254.3; 364/933;
364/955; 364/957.1
[58] Field of Search .................. 364/200, 900; 365/189

[56] References Cited

U.S. PATENT DOCUMENTS

| | | | |
|---|---|---|---|
| 3,380,030 | 4/1988 | McMahon | 364/200 |
| 3,949,378 | 4/1976 | Crabb et al. | 364/200 |
| 4,340,932 | 7/1982 | Bakula et al. | 364/200 |
| 4,449,184 | 5/1984 | Pohlman, III et al. | 364/200 |
| 4,574,349 | 3/1986 | Rechtschaffen | 364/200 |
| 4,654,790 | 3/1987 | Woffinden | 364/200 |

Primary Examiner—Michael R. Fleming
Assistant Examiner—Gopal C. Ray
Attorney, Agent, or Firm—Lowe, Price, LeBlanc, Becker & Shur

[57] ABSTRACT

In an apparatus for controlling the access of a memory, a memory is accessed in accordance with a physical address composed of a predetermined number of bits larger than another predetermined number of which a logical address is composed. For the purpose, a logical address region is equally divided by the number of mapping registers from which one register is selected in accordance with a content of a logical address. A physical address region is divided to provide a plurality of blocks from which one block is selected in accordance with a content of the selected one register.

3 Claims, 6 Drawing Sheets

| H7 | H6 | H5 |      | H7 | H6 | H5 |      |
|----|----|----|------|----|----|----|------|
| 0  | 0  | 0  | MPR0 | 1  | 0  | 0  | MPR4 |
| 0  | 0  | 1  | MPR1 | 1  | 0  | 1  | MPR5 |
| 0  | 1  | 0  | MPR2 | 1  | 1  | 0  | MPR6 |
| 0  | 1  | 1  | MPR3 | 1  | 1  | 1  | MPR7 |

FIG.5

| MAPPING REGISTER | LOWER BYTE (BINARY) MSB         LSB |
|---|---|
| MPR0 | 00000001 |
| MPR1 | 00000010 |
| MPR2 | 00000100 |
| MPR3 | 00001000 |
| MPR4 | 00010000 |
| MPR5 | 00100000 |
| MPR6 | 01000000 |
| MPR7 | 10000000 |

FIG.6

| IR \ ADDRESS | A1 | A0 |
|---|---|---|
| ST0 | 0 | 0 |
| ST1 | 1 | 0 |
| ST2 | 1 | 1 |

AN APPARATUS FOR ACCESSING A MEMORY

FIELD OF THE INVENTION

The invention relates to an apparatus for controlling the access of a memory, and more particularly to an apparatus for controlling the access of a memory in which a memory is accessed in accordance with a physical address of bits larger in number than bits for composing a logical address in a CPU.

BACKGROUND OF THE INVENTION

In one of conventional apparatus for accessing a memory, a memory is accessed in accordance with a physical address comprising more than sixteen bits by the control of a sixteen bit CPU. Consequently, a memory of a capacity which can not be normally accessed in accordance with an address signal of sixteen bits, for instance, a memory of 2M bits is possible to be accessed in accordance with the sixteen bit address signal under program control.

According to the conventional apparatus for accessing of a memory, however, a memory of a capacity larger than a capacity which is accessed in accordance with an address signal composed of a predetermined number of bits must be accessed by the control of a predetermined program. For the reason, there is a disadvantage that a structure of a program becomes complicated to enable memory access outside a block defined by the address signal.

SUMMARY OF THE INVENTION

Accordingly, it is an object of the invention to provide an apparatus for accessing a memory space which is larger than a capacity which is accessed in accordance with an address signal composed of a predetermined number of bits in accordance with the address signal without complicating program structure.

According to the invention, an apparatus for accessing a memory includes a first memory having a first predetermined physical address region which is divided into a plurality of blocks. Each of the blocks has a second predetermined physical address region. A second memory has a predetermined logic address region which is n times that of the second predetermined physical address region and which is smaller than that of the first predetermined physical address region, where n is an integer equal to or greater than 2. A plurality of mapping registers each store a respective address offset value under program control. Means is provided for producing a logic address signal having a bit length which is accessible to the second memory, and which is not accessible to the first memory. Finally, means is provided for controlling access of the first memory to designate one of the blocks of the first memory by storing an address offset value in a respective one of the plural mapping registers. The contents of one of the blocks of the first memory are stored in a corresponding region of the predetermined logic address region which is determined by the content of a respective one of the plural mapping registers. The corresponding region of the predetermined logic address region is accessed in the second memory by the logic address signal.

BRIEF DESCRIPTION OF THE DRAWINGS

The invention will be explained in more detail in conjunction with appended drawings wherein, FIG. 5 is an explanatory diagram showing a mapping register selection code when data are read from a mapping register and written thereinto in an apparatus for controlling the access of a memory in the embodiment, FIG. 6 is an explanatory diagram showing an immediate transfer code for a video display controller in the apparatus for displaying a color image.

DESCRIPTION OF THE PREFERRED EMBODIMENTS

Figure 1:
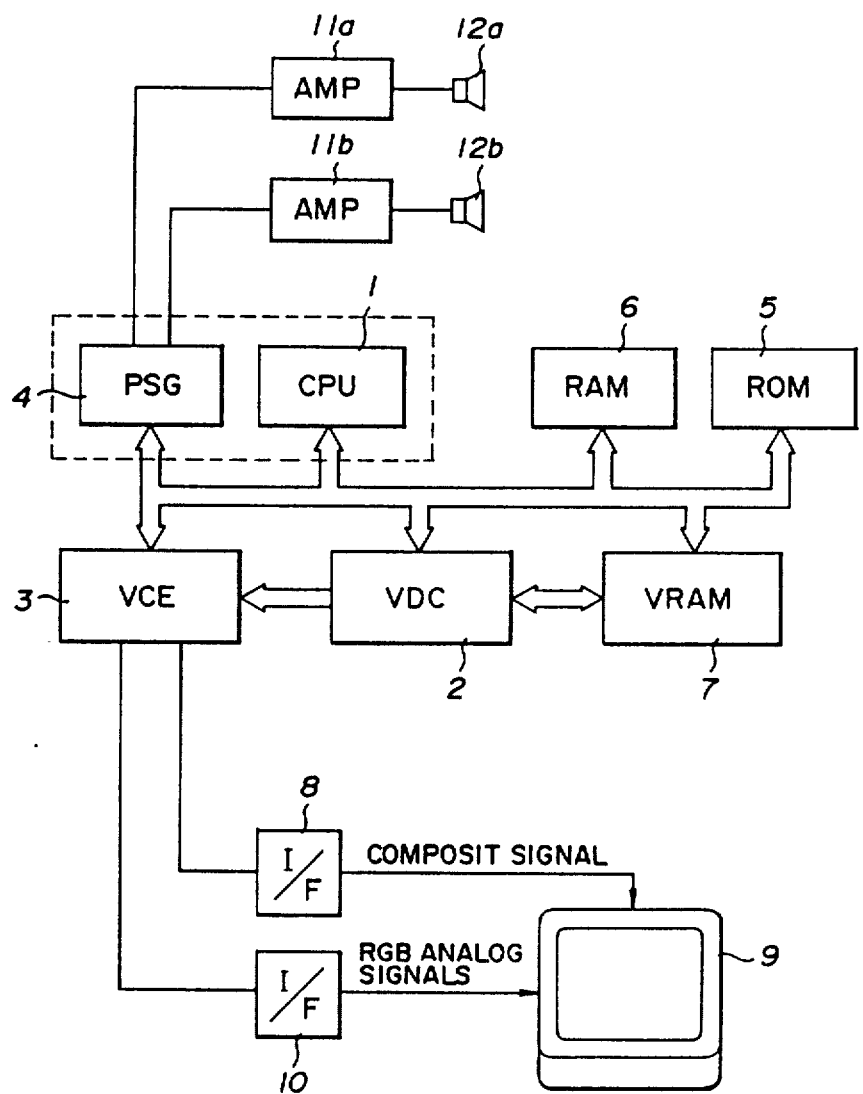
FIG. 1 is a block diagram showing an apparatus for displaying a color image in which an apparatus for controlling the access of a memory is included.

In FIG. 1, there is shown an apparatus for displaying a color image to which an apparatus for controlling the access of a memory according to the invention is applied In the apparatus for controlling the access of a memory, a CPU 1 performs a predetermined control in accordance with a program stored in ROM 5 so that data, arithmetical results etc. are stored into a RAM 6 temporarily. A video display controller 2 is provided therein to supply a video color encoder 3 with video data of a story, for instance, for a so-called television game read from a video RAM (VRAM) 7 in accordance with a control of the CPU 1 which deciphers a program for the television game stored in the ROM 5. The video color encoder 3 to which the video data are supplied produces RGB analog signals obtained in accordance with color data stored therein, or produces video color signal including a luminance signal and color difference signals obtained in accordance with the color data. Further, a programable sound generator 4 is provided therein to produce analog sound signals as left and right stereo sounds in accordance with a content of the ROM 5 which is supplied through the CPU 1 thereto. The video color signal produced in the video color encoder 3 is supplied through an interface 8 to a receiving circuit of a television set 9 as a composite signal, and the RGB analog signal is supplied through an interface 10 directly to a CRT of the television set 9 which functions as an exclusive use monitor means. On the other hand, the left and right analog sound signals are supplied through amplifiers 11a and 11b to speakers 12a and 12b to produce sounds.

Figure 2:
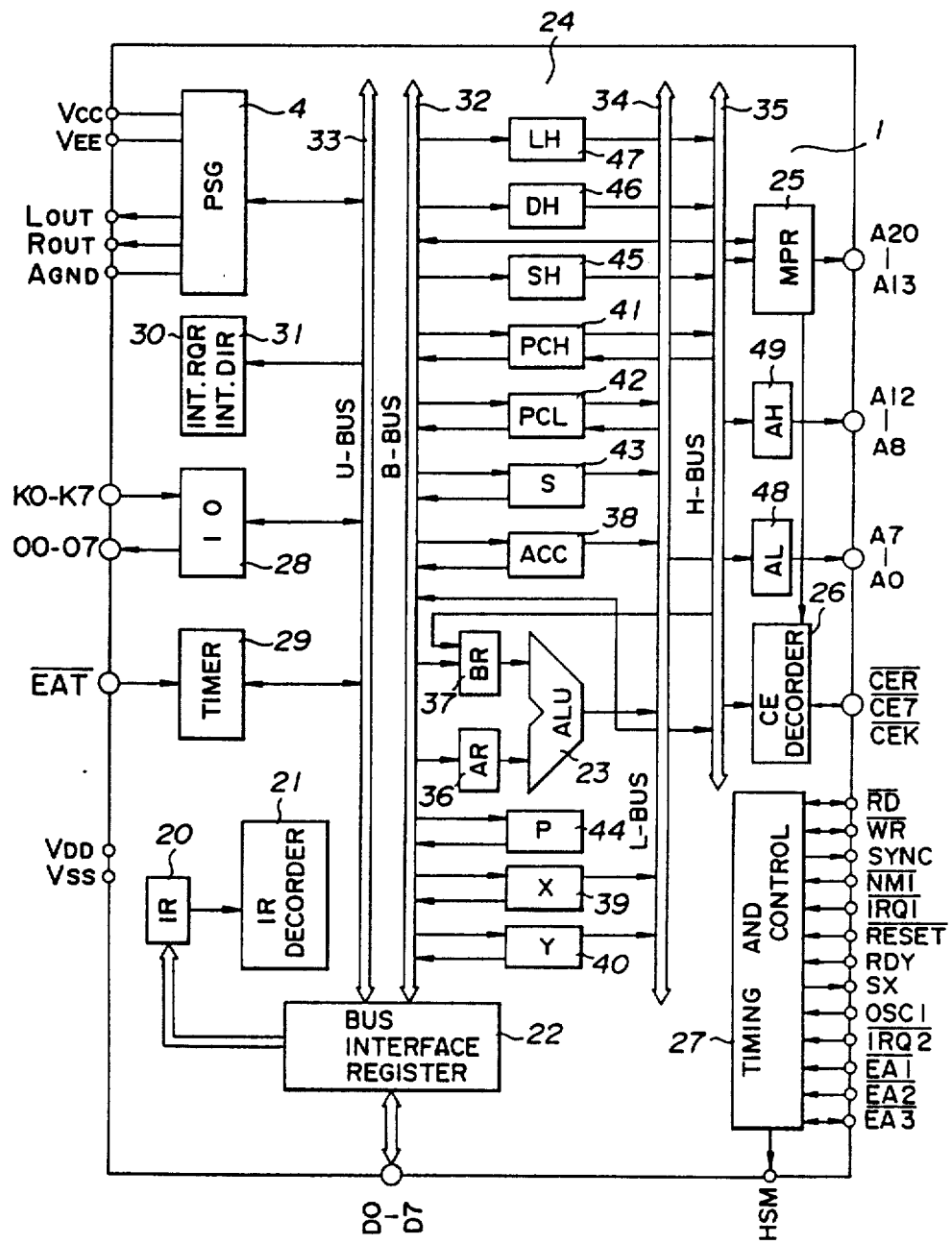
FIG. 2 is a block diagram showing an apparatus for controlling the access of a memory in an embodiment according to the invention.

FIG. 2 shows the CPU 1 and the programable sound generator 4 as encircled by a dotted line in FIG. 1. The CPU 1 in which an apparatus for controlling a transfer of data in the embodiment is included and comprises an instruction register 20, an instruction decoder 21, a bus interface register 22, an arithmetic and logic unit (ALU)

23, a set of registers 24, a mapping register 25, a chip enable decoder 26, a timing and control unit 27, an input and output port 28, a timer 29, an interrupt request register 30, an interrupt disable register 31, and so on. These units will be explained as follows.

(1) instruction register 20

The register 20 is loaded with an instruction code at an instruction fetch cycle.

(2) instruction decoder 21

The decoder 21 performs a sequential operation determined in accordance with an output of the instruction register 20, an interrupt input from a peripheral circuit or a reset input, and further performs a control of a branch command changing a flow of a program in accordance with informations of a status register described later.

(3) bus interface register 22

The register 22 controls a transfer of data among a B-bus 32, a U-bus 33 and an external bus D0 to D7. The ALU 23 and the set of registers 24 are connected by the B-bus 22 and the U-bus 33, and is connected to internal peripheral circuits. Further, a L-bus 34 for transferring lower eight bits of a logical address and a H-bus 35 for transferring upper eight bits of the logical address are provided. A logical address low register 48 is connected to the L-bus 34, and a logical address high register 49 is connected to the H-bus 35.

(4) ALU 23

The ALU 23 is provided with an A register 36 and a B register 37, and performs all of arithmetic and logic operation. The A and B registers 36 and 37 are loaded with one or two data so that an arithmetic operation is performed in accordance with a control signal of the instruction decoder 21 to supply one of the b, L and H-buses 32, 34 and 35 with a result of the arithmetic operation.

(5) set of registers 24

The set of registers 24 comprises following ten registers each being of eight bits.

(a) accumulator 38

The accumulator 38 is a wide use register which plays the most important role in an arithmetic and logic operation to be conducted when a memory arithmetic flag T of a status register described later is "0". Data thereof is supplied to an input of the ALU 23, and a result of the arithmetic is stored therein. The accumulator 38 is also used for a transfer of data between memories and between a memory and a peripheral circuit, and for a count of a data block length when a block transfer of data is performed. A lower data of the length are stored therein after data stored therein at the very moment are evacuated into a stack region of the RAM 6.

(b) X and Y registers 39 and 40

The registers 39 and 40 are wide use registers which are mainly used for an index addressing. The X register 39 is used for a designation of an address on page "0" of a memory which is a destination of an arithmetic operation, and for a storage of lower data of a source address after data stored therein at the very moment are evacuated into a stack region of the RAM 6 when a block transfer of data is performed. On the other hand, the Y register 40 stores lower data of a destination address after data stored therein at the very moment are evacuated into a stack region of the RAM 6 when a block transfer of data is performed.

(c) program counters 41 and 42

An up counter of sixteen bits is composed of the program counter 41 of upper eight bits and the program counter 42 of lower eight bits. The up counter is automatically incremented in accordance with the conduct of a command to designate an address of a command or operand to be next conducted. Contents of the counters 41 and 42 are evacuated into a stack region of the RAM 6 in a case where a command of subroutine is conducted, and an interrupt is produced, or after an interruption command of a software is conducted.

(d) stack pointer 43

The stack pointer 43 designates lower eight bits of the highest address on a stack region of the RAM 6, and is decremented after the pushing of data into the stack region and incremented before the pulling of the data from the stack region. For instance, two hundreds fifty-six (256) bytes of addresses "2100" to "21FF" are allocated to the stack region in a logical address.

(e) source high register 45, destination high register 46, and length high register 47

These registers function in case of a command of a block transfer. The source high register 45 provides an upper byte of a source address to designate the source address together with a content of the X register 39. The destination high register 46 provides an upper byte of a destination address to designate the destination address together with a content of the Y register 40. The length high register 47 provides upper eight bits for a down counter together with a content of the accumulator 38 so that a length of a block transfer is counted by a byte unit.

(6) mapping register 25

The mapping register 25 is composed of eight registers each being of eight bits to convert a logical address of sixteen bits to a physical address of twenty-one bits, and is selected by upper three bits of the H-bus 35.

(7) chip enable decoder 26

The chip enable decoder 26 provides chip enable outputs for following peripheral circuits by decoding upper eleven bits of a physical address.

(a) a chip enable for the RAM 6 . . . $\overline{\text{CER}}$ (b) a chip enable for the video display controller 2 . . . $\overline{\text{CE7}}$ (c) a chip enable for the video color encoder 3 . . . $\overline{\text{CEK}}$ (d) a chip enable for the programable sound generator 4 . . . $\overline{\text{CEP}}$ (e) a chip enable for the timer 29 . . . $\overline{\text{CET}}$ (f) a chip enable for the input and output port . . . $\overline{\text{CEIO}}$ (g) a chip enable for the interrupt request register 30 and the interrupt disable register 31 . . . $\overline{\text{CECG}}$ (8) timing and control unit 27

The unit 27 is connected to following terminals.

(a) $\overline{\text{RD}}$ terminal

A read timing signal is supplied through the $\overline{\text{RD}}$ terminal at a reading cycle.

(b) $\overline{\text{WR}}$ terminal

A write timing signal is supplied through the WR terminal at a writing cycle.

(c) SYNC terminal

A synchronous signal of "high" is supplied through the SYNC terminal at an instruction fetch cycle, that of "low" is supplied therethrough at a system reset timing.

(d) $\overline{\text{NMI}}$ terminal

A non-maskable interrupt is produced when $\overline{\text{NMI}}$ input signal is supplied through the NMI terminal. A sub-routine call is conducted by reading lower address from the logical address "FFFC" and upper address from the logical address "FFFD" when a command which is conducted in a program is completed.

(e) $\overline{IRQ1}$ and $\overline{IRQ2}$ terminals

A sub-routine call is conducted by reading lower address from the logical address "FFF8" and upper address from the logical address "FFF9" when $\overline{IRQ1}$ input becomes "low" in a case where a corresponding bit in the interrupt disable register 31 is "0", and a corresponding bit in the status register 44 is "0". At this time, the corresponding bit is set in the status register 44, and other corresponding bits are reset therein.

A sub-routine call is conducted by reading lower address from the logical address "FFF6" and upper address from the logical address "FFF7" when $\overline{IRQ2}$ input becomes "low" in a case where a corresponding bit in the interrupt disable register 31 is "0", and a corresponding bit in the status register 44 is "0". At this time, the corresponding bit is set in the status register 44, and other corresponding bits are reset therein.

(f) $\overline{RESET}$ terminal

A program is started by reading lower address from the physical address "001FFE" and upper address from the physical address "001FFF" when a $\overline{RESET}$ input becomes "low".

(g) RDY terminal

The CPU1 is started to operate when a RDY input is changed from "low" to "high".

(h) SX terminal

A complementary signal of a system clock signal is supplied through the SX terminal.

(i) OSC1 terminal

An external clock signal is input through the OSC1 terminal.

(j) $\overline{EA1}$ to $\overline{EA3}$ terminals

These are input terminals for a test of the CPU1.

(k) HSM terminal

A speed signal of "high" is supplied through the HSM terminal in case of a high speed mode of 21.47727 MHz/3, and that of "low" is supplied therethrough in case of a low speed mode of 21.47727 MHz/12.

(9) input and output port 28

The port 28 is connected to following terminals.

(a) K0 to K7 terminals

The terminals are input ports from which data are written in accordance with the conduct of a reading cycle in regard to the physical addresses "1FF000" to "1FF3FF".

(b) $\overline{O0}$ to $\overline{O7}$ terminals

The terminals are output ports with latches to which data are supplied in accordance with the conduct of a writing cycle in regard to the physical addresses "1FF000" to "1FF3FF".

(10) timer 29

The timer 29 is connected to a test input terminal $\overline{EAT}$ for the CPU1 and provides a timer signal through the U-bus thereto.

(11) interrupt request register 30

The register 30 is of eight bits among which five bits are not used, while the remaining two bits are "1" to show the $\overline{IRQ1}$ and $\overline{IRQ2}$ terminals "low" and the remaining one bit is "1" to show a timer interrupt caused. The register 30 is only used for "read".

(12) interrupt disable register 31

The register 31 is of eight bits among which five bits are not used, while the remaining two bits are "0" to make an interrupt request of the $\overline{IRQ1}$ and $\overline{IRQ2}$ terminals disable, and the remaining one is "0" to make an interrupt request disable in accordance with the timer interrupt signal.

Figures 3, 4:
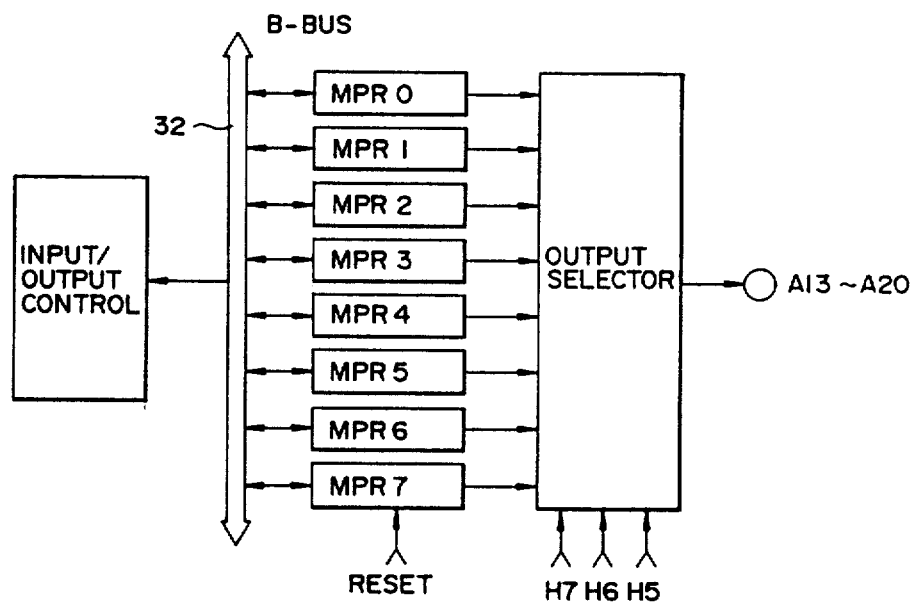
FIG. 3 is a block diagram showing a mapping register circuit in an apparatus for controlling the access of a memory in the embodiment.
FIG. 4 is an explanatory diagram showing a mapping register selection code when a physical address is produced in an apparatus for controlling the access of a memory in the embodiment.

In FIG. 3, there is shown the aforementioned mapping register 25 comprising eight registers MPR0 to MPR7 each being of eight bits, and connected through the B-bus 32 to an input output controller 50 and through an output selector 51 to the output terminals A13 to A20. The output selector 51 selects one register from the eight registers MPR0 to MPR7 of the mapping register 25 in accordance with upper three bits H5 to H7 of upper data of a logical address on the H-bus 35.

FIG. 4 shows a relation between the upper three bits H5 to H7 and one register selected from the eight registers MPR0 to MPR7. If it is assumed that the upper three bits H5 to H7 are "010", the register MPR2 is selected from the eight registers MPR0 to MPR7. Data are read from the mapping register 25 by a command "TMAi" where "i" is an integer selected from "0" to "7". For instance, data are read from the register MPR2 to be transferred through the B-bus 32 to the accumulator 38 in accordance with a command "TMA$_2$". On the other hand, data are written into the mapping register 25 by a command "TAMi" where "i" is an integer selected from "0" to "7". For instance, data are transferred to be written into the register MPR0 from the accumulator 38 by a command "TAM$_0$". The commands "TMAi" and "TAMi" are composed of two byte respectively, and lower byte thereof includes a bit of "1" corresponding in a bit number to a register number which is selected from the eight registers MPR0 to MPR7 and remaining seven bits of "0". When one of the eight registers MPR0 to MPR7 is selected in accordance with upper three bits of the H-bus 35, a content of the selected register is supplied through the output terminals A13 to A20 to a following stage so that a physical address of twenty-one bit is obtained together with a content of the logical address low register 48 to be supplied through the output terminals A0 to A7 thereto, and lower five bits of the logical address high register 49 to be supplied through the output terminals A8 to A12 thereto. When the most significant bit A20 of a physical address A0 to A20 is "1", a command by which data designated in accordance with the physical address A0 to A20 are immediate-transferred to the video display controller 2 is conducted. The command includes ST0, ST1 and ST2 by which codes are produced on A0 and A1 of the address bus at a write cycle as shown in FIG. 6. The command is set in the instruction register 20.

In operation, lower data of a logical address are set in the logic address low register 48, and lower five bits of upper data of the logical address are set in the logical address high register 49. Here, it is assumed that address data are set in the eight registers MPR0 to MPR7 of the mapping register 25 respectively. When upper three bits of upper data of the logical address, that is to say, upper three bits H5 to H7 of the H-bus 35 are "001", the register MPR1 is selected so that a content "F8" of the register MPR1 is supplied through the output terminals A13 to A20 to the following stage. These output signals are combined with output signals of the output terminals A8 to A12 and A0 to A7 to produce a physical address A0 to A20. Then, the chip enable decoder 26 decodes upper eleven bits A10 to A20 of the physical address A0 to A20 to produce a chip enable signal $\overline{CER}$ of "0" by which a data memory is enabled.

Figure 7:
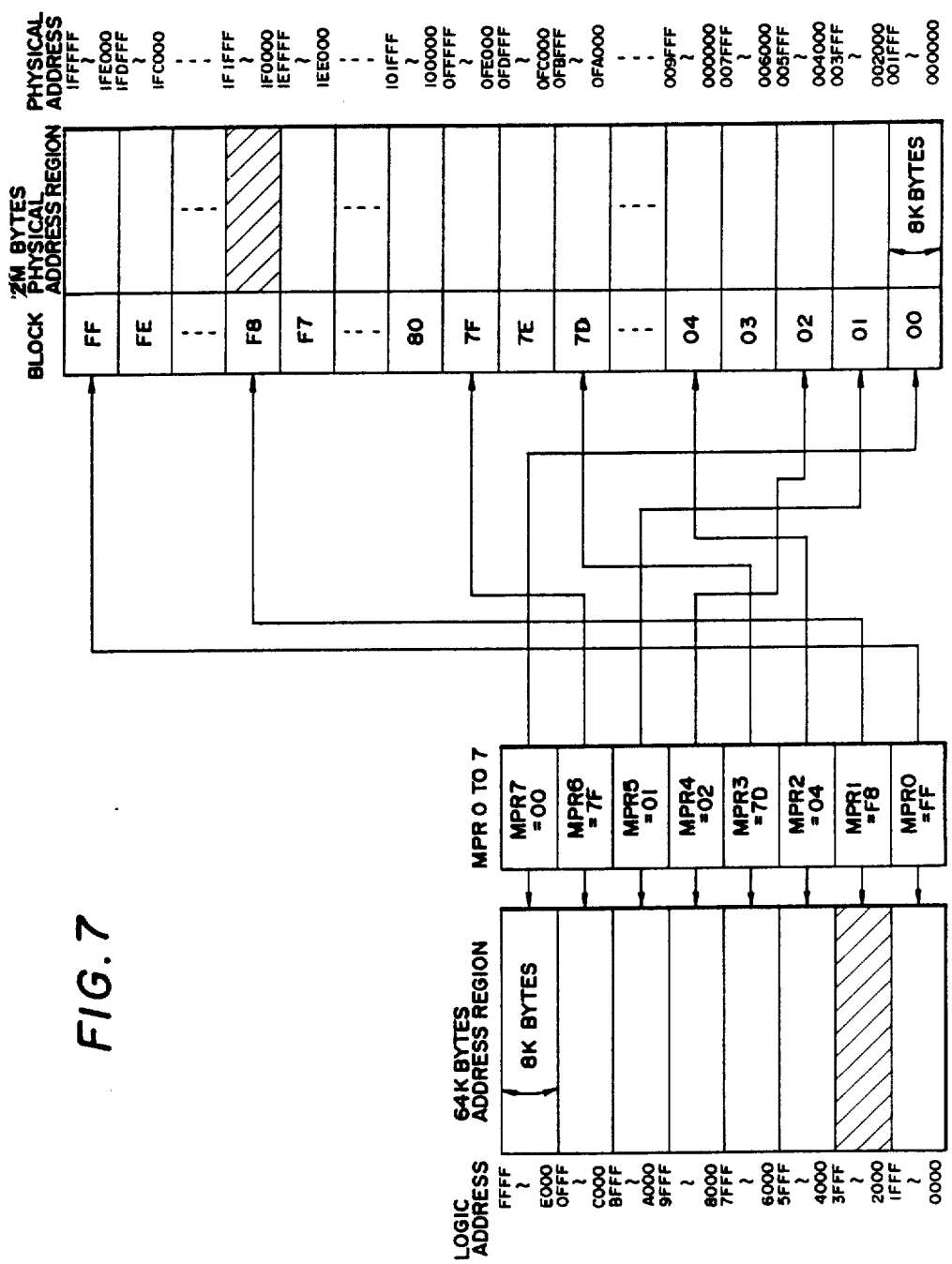
FIG. 7 is an explanatory diagram showing a relation between logical and physical address regions in an apparatus for controlling the access of a memory in the embodiment.

FIG. 7 shows a relation between a logical address of the CPU 1 and a physical address of the RAM 6 wherein a block "F8" of a physical address region having 2M bytes is allocated in accordance with a content "F8" of the selected register MPR1 in a case where a logic address of sixteen bits on the L and H-buses 34 and 35 corresponds to one address selected from addresses 2000 to 3FFF of a logical address region having 64K bytes as indicated by hatching lines therein. Thus, a memory of 2M bytes in which an address signal of twenty-one bits is required for the access thereof can be accessed by an address signal of sixteen bits. At this time, data at a corresponding address of a memory are immediate-transferred to a video display controller 2 in a case where lower two bits A0 and A1 of the physical address are of a content as shown in FIG. 6.

Figure 8:
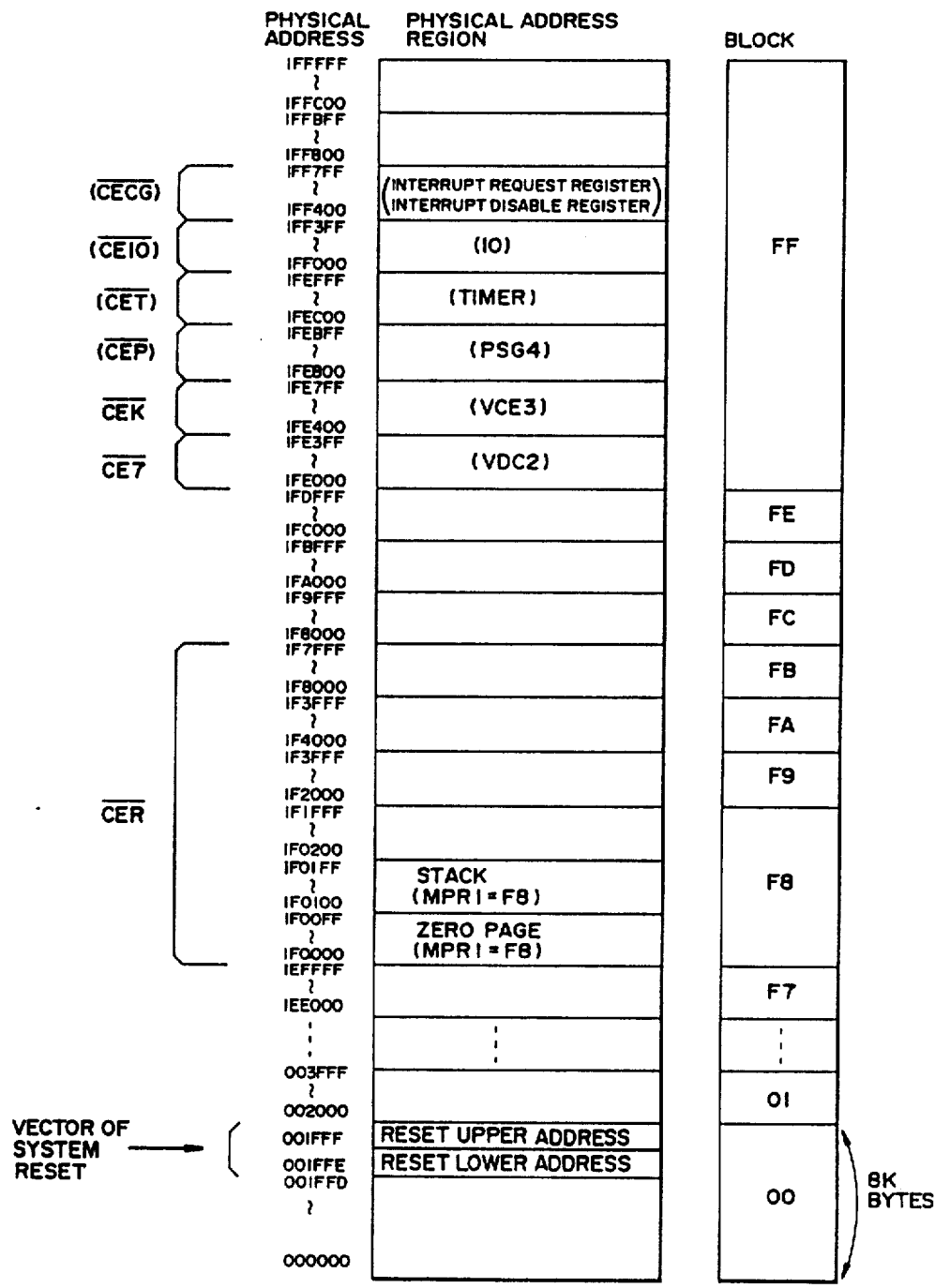
FIG. 8 is an explanatory diagram showing an allocation of a chip enable signal to a physical address region in an apparatus for controlling the access of a memory in the embodiment.

FIG. 8 shows a physical address region of the RAM 6 to which a chip enable signal $\overline{CER}$ is allocated. The chip enable signal $\overline{CER}$ is produced in accordance with a content of upper eleven bits A10 to A20 of a physical address A0 to A20 which is decoded in the chip enable decoder 26. For instance, the chip enable signal $\overline{CER}$ is allocated to a region of physical addresses 1F0000 to 1F7FFF in which zero page and stack regions are existed in a case where a content of the selected register MPR1 is "F8". The zero page and stack regions are of a region to which contents of the accumulator 38, the X register 39, and the Y register 40 are evacuated temporarily.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for accessing a memory, comprising:
a first memory having a first predetermined physical address region which is divided into plural blocks, each of said plural blocks having a second predetermined physical address region;
a second memory having a predetermined logic address region which is n times of said second predetermined physical address region and is smaller than said first predetermined physical address region, wherein n is an integer equal to or larger than two; means for determining an address offset value which is stored in one of plural mapping registers;
means for producing a logic address signal having a bit length which is accessible to said second memory, and is not accessible to said first memory; and
means for controlling an access of said first memory to designate one of said blocks of said first memory by said address offset value stored in a selected one of said plural mapping registers,
wherein contents of said one of said blocks of said first memory are stored in a corresponding region of said predetermined logic address region which is determined by said content of said selected one of said plural mapping registers, and said corresponding region of said predetermined logic address region is accessed in said second memory by said logic address signal.

2. An apparatus for accessing a memory, according to claim 1, wherein:
said selected one of said plural mapping registers is selected by predetermined bits of said logic address signal.

3. An apparatus for accessing a memory, according to claim 1, wherein:
a physical address signal is obtained by said content of said one of said plural mapping registers and said logic address signal, data at an address of said first memory which is designated by said physical address signal are immediate-transferred to a video display controller dependent on predetermined bits of said physical address signal.

* * * * *